Figure 3:
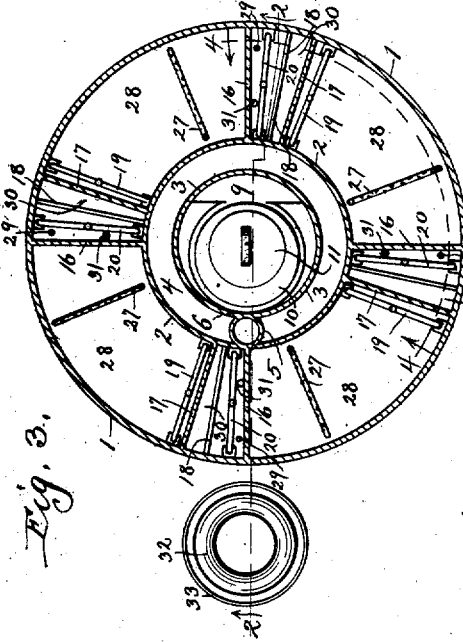

No. 677,226. Patented June 25, 1901.
H. JONE.
METHOD OF PRODUCING ELECTRICAL ENERGY FROM CARBONACEOUS MATERIALS.
(Application filed July 8, 1899.)

(No Model.)

Witnesses:
R. J. Jacker,
P. Plumtree

Inventor:
Hugo Jone.

UNITED STATES PATENT OFFICE.

HUGO JONE, OF CHICAGO, ILLINOIS.

METHOD OF PRODUCING ELECTRICAL ENERGY FROM CARBONACEOUS MATERIALS.

SPECIFICATION forming part of Letters Patent No. 677,226, dated June 25, 1901.

Application filed July 8, 1899. Serial No. 723,239. (No model.)

*To all whom it may concern:*

Be it known that I, HUGO JONE, a citizen of the United States, residing in Chicago, in the county of Cook and State of Illinois, have invented a new and useful Improvement in Methods of and Means for Producing Electrical Energy from Carbonaceous Materials, of which the following is a specification.

This invention relates to methods of and means for producing electrical energy from carbonaceous materials.

One object of the invention is to obtain a high yield of electrical energy from those kinds of fuel which contain carbon, free or combined, as the main constituent.

A further object is to obtain this electrical energy in the form of a current which is sufficiently strong for practical purposes.

Other objects will become apparent hereinafter.

The invention consists, substantially, in first generating an electric current by the combination of a metal with an acid radical and then reducing, by means of the oxidation energy of carbonaceous fuel, the compound thus formed to the metal and repeating the generation, whereby, however, the selection of an especially-suitable metallic compound is of particular importance, and, furthermore, in the construction of the battery in which the current is generated, all as will be more fully hereinafter set forth, as illustrated in the accompanying drawings, and finally specifically pointed out in the appended claims.

I will first set forth the principles underlying my invention and will then describe an illustrative form of the invention.

In order to obtain a high yield of electrical energy, it is evidently necessary to select a metal which is capable of producing much electrical energy and which at the same time can be reduced easily from a compound formed in the battery and with expenditure of an amount of energy which is but little greater than the energy obtained from the metal by its oxidation in the battery. Lead and tin come up to these requirements or can be made to come up to them.

If the acid radical which generally is combined with the metal in the battery is reduced in the reduction of the compound, besides being separated from the metal, I utilize the potential energy of both reduction products, the metallic and the acid, for the generation of electrical energy, provided the potential energy of the acid-reduction product is great enough to warrant it. It is an advantage to be able to utilize for the generation of electrical energy both the acid and the metallic reduction products, since the acid radicals of some of the most suitable battery products lose oxygen in the reduction.

In utilizing the potential energy of the reduced acid radical—such as, for instance, sulfur dioxid obtained by the reduction of a sulfate—I utilize also its temperature. I pass it through a solution of ferric chlorid, thus obtaining ferrous chlorid, which by oxidation is capable of furnishing electrical energy. As the sulfur dioxid is hot when it comes from the reduction-retort, where the sulfate is reduced, it heats up the ferric-chlorid solution, thus producing the elevated temperature which is necessary for the rapid reduction of ferric salts by sulfur dioxid, and therefore accelerating the reduction of the ferric chlorid. A similar utilization of heat is accomplished by surrounding the reduction-retort by the cells in which the metal and the sulfur dioxid are to generate electrical energy by oxidation. The elevated temperature of the cells thus obtained by contact with the reduction-retort accelerates the oxidation of the metal and the sulfur dioxid if the oxidants are suitably selected and at the same time facilitates the regeneration of the nitric acid, which is used as a depolarizer, as will be seen hereinafter.

Wherever in the process of converting the potential energy of the carbonaceous material into electrical energy an endothermic reaction can be used, this is done in preference to exothermic reactions, because the former afford the conversion of the heat which they absorb into chemical energy, which in turn may be converted into electrical energy.

Other features of the present invention are a device for the prevention of the diffusion of electrolytes and a method for the removal of the battery product from electrolyte or electrode. The prevention of diffusion is based on the fact that nitric acid, which I use as a depolarizer, is evaporated when it diffuses into a vessel containing hot sulfuric acid owing to the dehydrating action of the sulfuric acid and to the high temperature. If a narrow vessel of porous clay containing sulfuric acid be interposed between nitric acid and an electrolyte which is to be oxidized by the nitric acid at a temperature above the boiling-point of the nitric acid, the nitric acid is partly or wholly evaporated before it can diffuse into the electrolyte, while electrolytic action continues. Neither can the oxidizable substance in the electrolyte diffuse into the nitric acid if it be produced at a distance, so that it is oxidized before it reaches the nitric acid. If, for instance, ferric salt is reduced by sulfur dioxid in a cell where nitric acid is used as a depolarizer, the ferrous salt thus formed will be oxidized before it reaches the nitric acid if it is sufficiently distant from the acid.

Although the nitric acid is not in contact with the oxidizable substance, it oxidizes that substance by means of "molecular exchange." Many cells have, so far as I can see, this molecular exchange in common with the present cell—for instance, that known as "Mortaud's" cell. Just as in Mortaud's cell, the peroxid of lead oxidizes the nascent hydrogen which is liberated at a distance from it—namely, on the surface of the zinc electrode—so also in the present case the nitric acid oxidizes the ferrous chlorid or a similar substance, although these two substances are locally separated from each other. The two oxidations may be explained on the theory that the dilute sulfuric acid which is between the reacting substances in either case acts as a transmitter of either hydrogen or oxygen, so that the hydrogen is conveyed to the oxidant or else the oxygen of the oxidant to the oxidizable substance. The hydrogen liberated on the surface of the zinc may be said to enter into the adjoining sulfuric-acid molecule located in the direction of the oxidant, thus displacing an equivalent quantity of hydrogen, which in turn displaces an equivalent quantity of hydrogen in the next sulfuric-acid molecule. This displacement of hydrogen by hydrogen being continued, hydrogen will ultimately be liberated from a sulfuric-acid molecule which is in contact with the oxidant, so that the hydrogen is oxidized. In the analogous way the oxygen of the oxidant would be transferred to the oxidizable substance. It is immaterial if it is the hydrogen which is transmitted or the oxygen. Experiment shows that if ferrous chlorid is suitably combined with nitric acid in a galvanic cell and a narrow porous vessel of sulfuric acid is interposed the ferrous chlorid is oxidized by the nitric acid at a temperature approaching the boiling-point of water and an electric current is generated thereby. The fact that the two substances which are locally separated from each other react with each other I have just attributed to molecular exchange; but it is to be remembered that there is no absolute proof for the theory of molecular exchange, but that it is merely a "working theory." The kind of chemical reactions which are based on molecular exchange are well adapted for the purpose in hand, as they do not only permit the interposing of sulfuric acid, but also are just those reactions which produce electrical energy in galvanic cells.

The removal of the battery product from an electrolyte or from an electrode is based on the decomposition of a salt by an acid which forms an almost insoluble salt with the base of the salt decomposed. If, for instance, the battery product is a lead salt, I may use the addition of sulfuric acid, rid the electrolyte of the dissolved lead salt and eventually rid the lead electrode, if such be used, of a crust of lead salt.

These are the principles underlying the invention. They can be applied to different sets of chemicals, and they may not all be applied simultaneously, thus yielding several forms of the invention.

As an illustrative embodiment of these principles, I will describe a form of the invention in which sulfate of lead is the substance to be reduced. The main features of this form of the invention are as follows: The sulfate of lead is heated with coal and reduced to sulfid. The resulting sulfid is heated with another quantity of the sulfate, yielding metallic lead and sulfur dioxid. The metallic lead after being purified and cast into sheets is used as an electrode in a solution containing ferric chlorid and hydrochloric acid, while nitric acid contained in a porous cup is used as a depolarizer. The sulfur dioxid is passed through the solution of ferric chlorid, yielding ferrous chlorid and sulfuric acid. An electric current is obtained by the action of the ferric chlorid upon the lead and increased by the oxidation of the ferrous chlorid resulting from the reduction of the ferric chlorid by both the sulfur dioxid and the lead electrode, the oxygen being supplied by the nitric acid. By this oxidation ferric chlorid is again formed and can again be reduced. The nitric acid is regenerated by allowing the gaseous lower oxids of nitrogen resulting from the deoxidation of the nitric acid to come in contact with air in the presence of moisture and at an elevated temperature. Under these conditions, and particularly in consequence of the elevated temperature, nitric acid is again obtained by oxidation and condensation and may again be supplied to the battery. The circulation of the oxids of nitrogen is secured by their own evaporation and condensation. Nitric acid is chosen as the oxidant because it is a good depolarizer and because it can easily be regenerated by supplying atmospheric oxygen, as just described. The lead chlorid in solution and that which accumulates on the lead electrode in the form of a crust is decomposed by the sulfuric acid, and the sulfate of lead is allowed to accumulate at the bottom of the cell for future reduction, while the hydrochloric acid is restored. With this arrangement the action of the cell can be continued by supplying lead electrodes and sulfur dioxid until it becomes necessary to remove the sulfate of lead which accumulates at the bottom and supplying the reduction products—namely, sulfur dioxid and metallic lead—to the cell.

The apparatus in which these processes are carried out consists, substantially, of a retort and an electric battery surrounding it, suitably arranged and connected. In the accompanying drawings I have shown an illustrative form of the apparatus.

Figure 4:
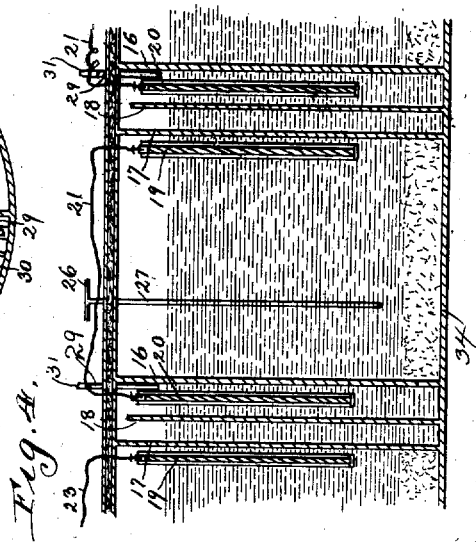
Figure 1:
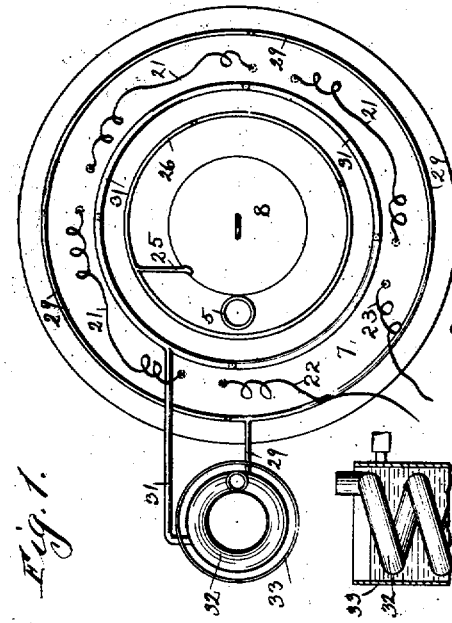
Figure 2:
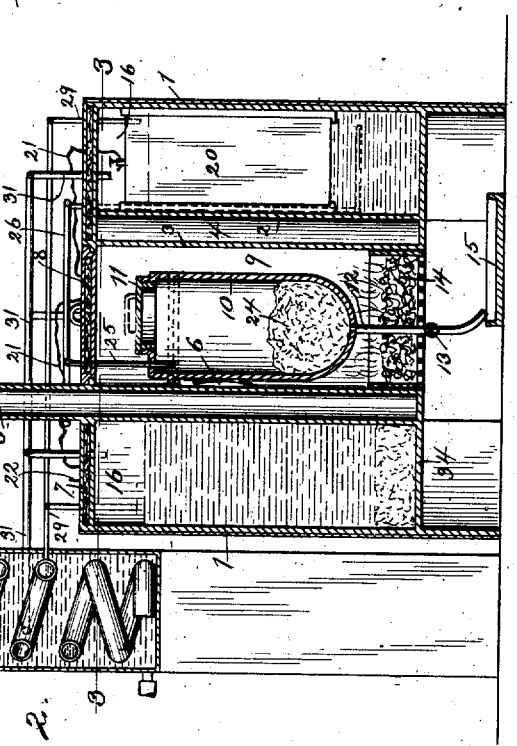

Referring to the drawings and to the various views and reference-signs appearing thereon, Figure 1 is a top plan view of the apparatus. Fig. 2 is a vertical section on line 2 2 of Fig. 3 seen in the direction indicated by the arrows. Fig. 3 is a horizontal section on line 3 3 of Fig. 2. Fig. 4 is a vertical section on line 4 4 of Fig. 3 seen in the direction indicated by the arrows.

The same reference-sign designates the same part wherever it occurs in the several views.

The retort 10 in the apparatus shown is surrounded by a battery of four cells. These cells occupy the space between the walls 2 and 1, walls 16 dividing that space into the four cells. The number of cells, however, is immaterial and may be varied, the present case of four cells being merely an example. The retort 10 communicates through pipe 25 with the circular pipe 26, whose branches 27 in turn deliver into the liquid contained in the sections 28 of the cells. This liquid consists of a solution of ferric chlorid in hydrochloric acid. When the battery is running, some chlorid of lead which is formed in the battery reaction also goes into solution, the battery being kept at an elevated temperature. The retort 10 is heated by fuel introduced into fire-pan 14 through opening 9. The furnace-gases pass through opening 6 into the passage-way 4, circulate around the furnace 3, which supports the retort 10, heating up the cells on the outside, and finally escape through the smoke-stack 5. Pipe 12, which can be closed by valve 13, is a drain-pipe for retort 10, adapted to deliver molten metallic lead from retort 10 to pan 15.

Each of the cells is divided into three sections by the walls 17 and 18, section 28, which has been mentioned above, being that between wall 17 and the cell-wall 16. Section 30, which is between walls 18 and 17, contains sulfuric acid of about sixty per cent., ($H_2SO_4$.) The section between wall 18 and wall 16 on the other end of the cell contains nitric acid. In this nitric-acid section there is a stationary carbon-electrode 20, suitably supported and insulated. In section 28, containing ferric-chlorid solution, there is a lead electrode 19, which, however, is removed when the battery is not running.

The battery is kept at a temperature which is sufficiently high to slowly evaporate the nitric acid in the nitric-acid section along with the lower oxids of nitrogen which are formed by the reduction of the nitric acid in the battery reaction. The vapors pass through pipe 31 into the condenser-coil 32, which is within vessel 33 and cooled by water contained in that vessel. In this condenser-coil the vapors come in contact with atmospheric air, are oxidized to peroxid of nitrogen and then to nitric acid, and condensed, sufficient moisture being distilled along with the vapors. The condensed nitric acid flows back through pipe 29 into the nitric-acid sections of the cells.

Walls 17 and 18 are made of porous clay, so that electrolytic action between the electrodes 19 and 20 can take place through them. Wall 18 does not quite reach up to the cover of the cell, so that any nitric acid which penetrates into section 30 through the porous wall 18 can after evaporation unite with the vapor from the nitric-acid section. This nitric-acid vapor from section 30 then is finally transferred to the nitric-acid sections after passing through the condenser.

The chlorid of lead formed by the battery reaction is decomposed by the sulfuric acid formed from the sulfur dioxid passing into the cell through pipe 27.

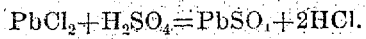
$$PbCl_2 + H_2SO_4 = PbSO_4 + 2HCl.$$

The sulfate of lead thus formed accumulates at the bottom of the cell as a sediment 34.

A mixture of sulfate of lead and sulfid of lead 24 is shown on the bottom of the retort 10. The retort can be closed and opened by a screw-cap 11. Access to the retort 10 is obtained by raising cover 8 of the furnace 3, which is a part of the larger cover 7 of the battery.

The electrodes of the cells are connected by wires 21 in the usual manner, the current being obtained between wires 21 and 23.

The operations are as follows: A suitable quantity of sulfate of lead is placed in the retort 10. A quantity of coal which is nearly sufficient to reduce the sulfate to sulfid is added to the sulfate and mixed with it. The mixture is heated by means of fuel heat applied to the retort until the whole of the carbon in the coal is oxidized. The reaction is represented by the following formula:

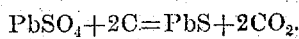
$$PbSO_4 + 2C = PbS + 2CO_2.$$

The carbon dioxid thus formed is allowed to escape. It may be passed through pipe 26 and the perforated branches 27 of the same if it be desired to heat up the liquid in the battery. The sulfid is freed from impurities which may have been brought into it by the coal, and then it is mixed with sulfate of lead in sufficient quantity to yield metallic lead and sulfur dioxid, as follows:

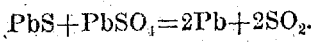
$$PbS + PbSO_4 = 2Pb + 2SO_2.$$

This reduction is effected by again applying fuel heat to the retort. The sulfur dioxid is allowed to pass through pipe 26, its perforated branches 27, and the liquid in the cells, and thus to reduce the ferric chlorid in the liquid to ferrous chlorid.

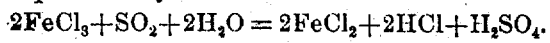
$2FeCl_3 + SO_2 + 2H_2O = 2FeCl_2 + 2HCl + H_2SO_4.$

Previous to this, however, the generation of an electric current is started by putting the lead electrodes 19 into their places in the cells and suitably connecting them with the carbon electrodes. The current may be considered as consisting of two currents, one generated by the action of the ferric chlorid on the lead electrode and the other by the action of the nitric acid through the interposed porous walls and sulfuric acid by means of molecular exchange on the ferrous chlorid, the reactions being as follows:

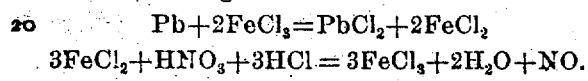
$$Pb + 2FeCl_3 = PbCl_2 + 2FeCl_2$$
$$3FeCl_2 + HNO_3 + 3HCl = 3FeCl_3 + 2H_2O + NO.$$

The flow of sulfur dioxid is so regulated that the sulfuric acid formed is not more than sufficient to decompose the chlorid of lead formed in the battery reaction. The lead in the retort being melted is allowed to flow into pan 15 in such a manner that it is separated from any coal-ashes which may float on it, and that the shape of the metal in the pan after solidification is one suitable for the use of the metal as an electrode—preferably that of a sheet. Any ashes which may have remained in the retort are removed. Another quantity of sulfate of lead is then reduced to sulfid by coal, as before, and the sulfid again mixed with another quantity of sulfate of lead and the mixture heated so that sulfur dioxid and metallic lead are obtained. The sulfur dioxid is again utilized to reduce ferric chlorid in the cells, and the lead is again collected in a pan. Thus the reductions are repeated. The sheets of lead thus obtained are reserved until they are needed for use as electrodes. Whenever a lead electrode is consumed or nearly consumed by the battery reaction, one of the reserve sheets of lead is substituted for it. The sulfate of lead which is deposited by the battery is allowed to accumulate. When it is desired to remove it, the lead electrodes are lifted out of the cells, the reductions are discontinued, the liquid in the cells is drawn off by means of siphons, and the deposit of sulfate of lead is removed. This sulfate of lead is reserved until it is needed for either of the reductions, when the required quantity is supplied to the retort. Thus the sulfate of lead which is removed from the battery is reduced, yielding metallic lead and sulfur dioxid. These two reduction products are supplied to the battery, forming again sulfate of lead, which is then again reduced, so that the process is repeated and the generation of electrical energy continued. The temperature of the battery is regulated so that the nitric acid which enters into the sulfuric-acid section 30 is evaporated. The vapors of the oxids of nitrogen which rise from the nitric-acid sections and the sulfuric-acid sections are allowed to pass into the condenser-coil 32 through pipe 31. In this coil they come in contact with the air, are oxidized, and then condensed to nitric acid. The nitric acid flows back into the nitric-acid sections of the cells through pipe 29. This process of distillation, oxidation, and condensation is kept up by regulating the temperature of the battery and supplying sufficient cooling-water to the condenser. Thus oxygen is supplied to the nitric acid, while the generation of electrical energy which consumes that oxygen goes on.

The potential difference of a cell at 100° centigrade is about 1.75 volts. The internal resistance of a cell containing one gallon of liquid and of the form shown in the drawings is 0.4 ohm at 100° centigrade. The current strength is four amperes with an external resistance of 0.04 ohm. The yield in electrical energy amounts to thirty-five per cent. of the electrical equivalent of the heat which would be given off in the oxidation to carbon dioxid of the carbon consumed with a battery holding four gallons of liquid.

In order to obtain better electrodes which offer a large surface to the electrolyte and reduce the internal resistance, the lead cast into forms for use as electrodes may be crystallized by allowing it to cool down slowly.

The low melting-point of the metallic lead affords several advantages. Impurities which might happen to be in the reduction-retort are kept out of the lead. Most other metals, for instance, being less fusible, do not enter into the molten metallic lead in the reduction, so that the local action which they would produce when the lead is subsequently used as an electrode is thereby prevented. Any tin, if present, might be melted together with the lead, but could not enter into the sulfate of lead formed at the bottom of the cells, since it would not be precipitated as sulfate. As a result there is little or no local action. The low melting-point of the lead also permits the saving of fuel in the casting of electrodes, since most other metals having higher melting-points require more fuel in that process. Likewise the remnants of the lead electrodes which are not consumed in the battery can be easily utilized, since they can be melted together to form a complete electrode.

The high specific gravity of the metallic lead aids in maintaining the lead pure. It effects the separation of the ashes of the coal, since they are lighter than the molten lead. Since, also, the other reduction product—namely, the sulfur dioxid—does not carry the ashes along with it into the cells, the electrolyte is not contaminated with the ashes. Both reductions—that of the sulfate of lead to sulfid and that of the mixture of sulfate and sulfid to metallic lead—may be carried out in the same process and at the same time if the coal is comparatively pure. If, however, the coal is impure, it is advantageous to effect the reductions separately and to remove the impurities from the sulfid obtained in the first reduction.

The ferric chlorid affords several advantages. It acts quicker on the lead electrode than hydrochloric acid and produces a stronger current. It affords the production of an additional current after its action as an oxidizer by the formation of ferrous chlorid, which, as explained hereinabove, is again oxidized with the generation of an electric current and with re-formation of ferric chlorid, which then again serves as an oxidizer. The ferric chlorid also obviates the formation of two different battery products in two different cells by being reducible by both sulfur dioxid and metallic lead. The ferrous chlorid, although obtained by two different reductions, yields, evidently, ferric chlorid in either case in the battery reaction.

Hydrochloric acid and ferric chlorid are preferred to hydrobromic acid and ferric bromid and to similar acids and salts, because the chlorid affords the production of more electrical energy, owing to its greater heat of formation.

What I claim as useful, and desire to secure by Letters Patent, is as follows:

1. The method of generating electrical energy which consists in first reducing, by means of the oxidation energy of carbonaceous fuel, the sulfate of a metal to the metal and sulfur dioxid, and then producing electrical energy first by combining the metal with an electronegative substance in a galvanic cell, and secondly by reducing a metallic compound by the sulfur dioxid, and combining the product obtained from the metallic compound by this reduction with an oxidant in a galvanic cell, whereby the oxidation energy of the carbonaceous fuel is converted first into chemical and then into electrical energy.

2. The method of generating electrical energy which consists in first reducing, by means of the oxidation energy of carbonaceous fuel, sulfate of lead to metallic lead and sulfur dioxid, then reducing a ferric salt to the ferrous salt by the sulfur dioxid, thereby converting said sulfur dioxid into sulfuric acid, producing electrical energy by combining the ferrous salt thus obtained, with an oxidant in a galvanic cell, and furthermore by combining the lead with an acid chlorid in a galvanic cell, and finally decomposing the lead chlorid formed in this latter combination, by the sulfuric acid formed from the sulfur dioxid, whereby the oxidation and neutralization energies of the lead and the sulfur dioxid directly, and the oxidation energy of the carbonaceous fuel indirectly, are converted into electrical energy, with restoration of the sulfate of lead, and with consumption of no other substance than oxygen, besides the carbonaceous fuel.

3. The method of generating electrical energy which consists in first reducing, by means of the oxidation energy of carbonaceous fuel, the sulfate of a metal to the metal and sulfur dioxid, then reducing, by means of the sulfur dioxid as the reducing agent, ferric chlorid in solution to ferrous chlorid, the solution being separated from liquid nitric acid by a narrow column of sulfuric acid at a temperature sufficiently high to evaporate the nitric acid entering it, combining the iron solution with the nitric acid in a galvanic cell, thus oxidizing the ferrous chlorid formed by the reduction to ferric chlorid by the action of the nitric acid, with generation of an electric current, and combining the metal with an electronegative substance also in a galvanic cell, whereby the oxidation energy of the carbonaceous fuel is converted first into chemical and then into electrical energy, and the loss of energy due to diffusion is decreased.

HUGO JONE.

Witnesses:
G. KATE ARMSTRONG,
MARY F. LINCOLN.